United States Patent
Park et al.

(10) Patent No.: US 8,200,139 B2
(45) Date of Patent: Jun. 12, 2012

(54) APPARATUS FOR SCANNING DUPLEX DOCUMENT AND METHOD OF SCANNING DUPLEX DOCUMENT USING THE SAME

(75) Inventors: Sang-cheol Park, Suwon-si (KR); Yong-kon Jo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 873 days.

(21) Appl. No.: 11/870,630

(22) Filed: Oct. 11, 2007

(65) Prior Publication Data

US 2008/0226369 A1 Sep. 18, 2008

(30) Foreign Application Priority Data

Mar. 16, 2007 (KR) .................. 10-2007-0026274

(51) Int. Cl.
*G03G 15/00* (2006.01)
(52) U.S. Cl. ........ 399/374; 399/367; 399/373; 358/496; 271/65; 271/184; 271/186
(58) Field of Classification Search .......... 271/65, 271/291; 399/374, 373, 402; 358/496
See application file for complete search history.

(56) References Cited

U.S. PATENT DOCUMENTS

| | | | | |
|---|---|---|---|---|
| 4,855,788 A | * | 8/1989 | Fujii | .............. 399/367 |
| 5,430,536 A | | 7/1995 | Fullerton et al. | |
| 5,461,468 A | | 10/1995 | Dempsey et al. | |
| 5,669,056 A | * | 9/1997 | Rubscha | .............. 399/367 |
| 6,101,283 A | | 8/2000 | Knox | |
| 7,533,882 B2 | * | 5/2009 | Song | .............. 271/186 |
| 7,623,277 B2 | * | 11/2009 | Wang et al. | .............. 358/498 |

FOREIGN PATENT DOCUMENTS

| | | |
|---|---|---|
| EP | 0 654 933 | 5/1995 |
| JP | 63-117835 | 5/1988 |
| JP | 3-215871 | 9/1991 |
| JP | 8-208130 | 8/1996 |
| JP | 2002-80147 | 3/2002 |
| JP | 2005-311954 | 11/2005 |

OTHER PUBLICATIONS

International Search Report dated Dec. 4, 2008 of the European Patent Application No. 07123226.8.
Korean Office Action issued Jun. 28, 2011 in corresponding Korean Patent Application 10-2007-0026274.
Korean Office Action issued Aug. 31, 2011 in corresponding Korean Patent Application 10-2007-0026274.

* cited by examiner

*Primary Examiner* — Matthew G Marini
(74) *Attorney, Agent, or Firm* — Staas & Halsey LLP

(57) ABSTRACT

A method and apparatus for efficiently scanning a duplex document in which a scan unit sequentially scans both sides of a sheet of a duplex document by moving the sheet across a reader, and a reverse output unit to output the sheet after turning over the sheet. Therefore, since the sheet of a document can be fed and scanned while the second side of the previous sheet of the document is scanned, scanning time can be reduced. Particularly, the reduction in scanning time is very useful when multiple sheets of a duplex document need to be scanned.

18 Claims, 15 Drawing Sheets

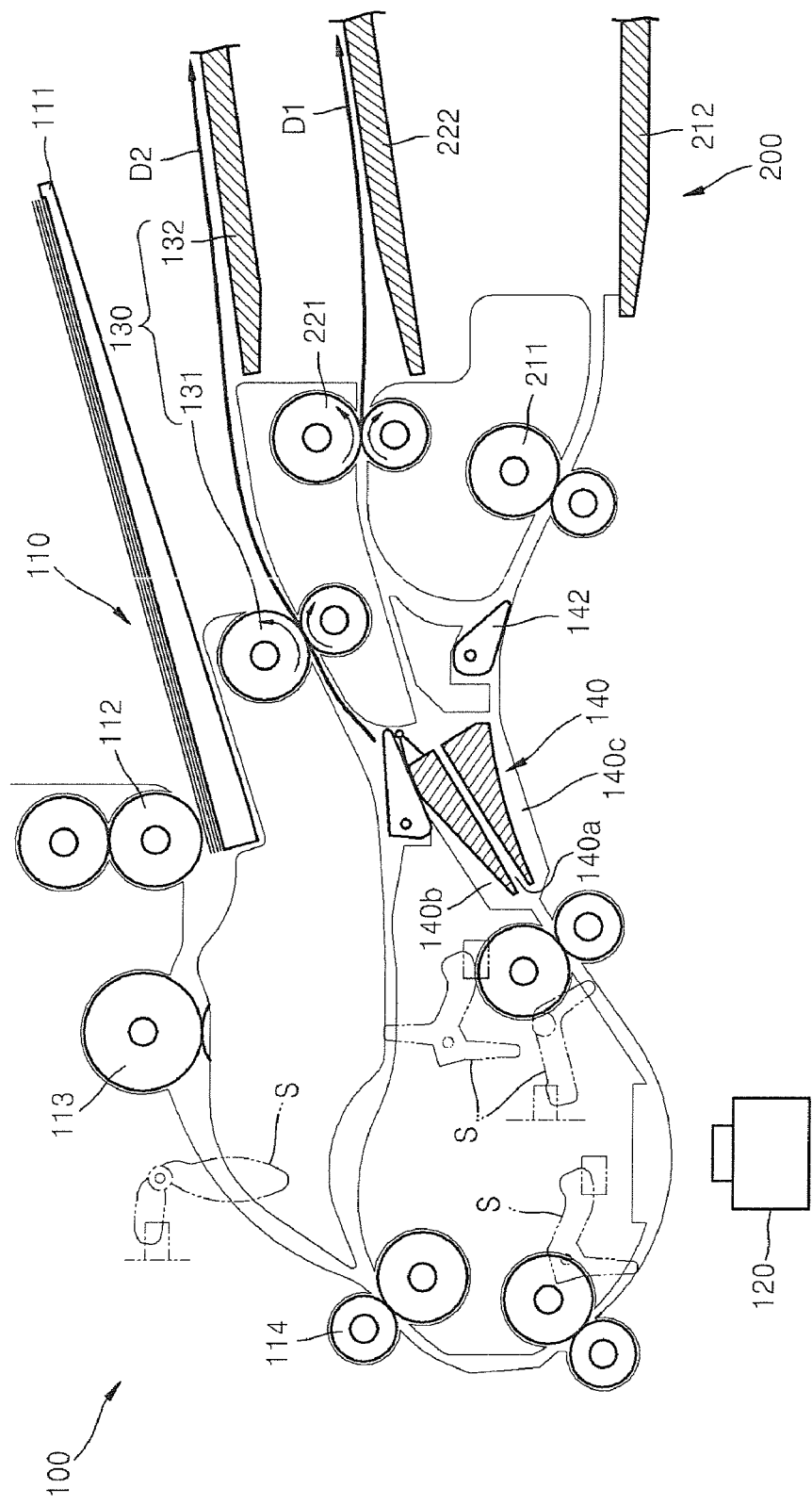

APPARATUS FOR SCANNING DUPLEX DOCUMENT AND METHOD OF SCANNING DUPLEX DOCUMENT USING THE SAME

CROSS-REFERENCE TO RELATED PATENT APPLICATIONS

This application claims the benefit of Korean Patent Application No. 2007-26274, filed Mar. 16, 2007, in the Korean Intellectual Property Office, the disclosure of which is incorporated herein in its entirety by reference.

BACKGROUND OF THE INVENTION

1. Field of the Invention

Aspects of the present invention relate to a duplex document scanning method and an apparatus for sequentially reading images from both sides of a document, and more particularly, to a duplex document scanning method and apparatus for scanning both sides of a duplex document quickly.

2. Description of the Related Art

In conventional duplex document scanning apparatuses, a duplex document is automatically fed and images are read from both sides of the duplex document. Such conventional duplex document scanning apparatuses are widely used for various image reading/processing devices such as scanners, copiers, fax machines, and multifunctional apparatuses.

FIGS. 1A through 1E are views for illustrating an example of a conventional duplex document scanning apparatus and its scanning method disclosed in U.S. Pat. No. 5,430,536 to Fullerton et al. Referring to FIG. 1A, a document sheet D is picked up from a document input tray 20 and is fed along a document feed path. Moving to FIG. 1B, an image is read from one side of the document sheet D by a reader 14. Then, the document sheet D is delivered onto a document output tray 22 by eject rollers 50. If the document sheet D is single sided (i.e., the document sheet D is a simplex sheet), the eject rollers 50 completely eject the simplex document sheet D onto the document output tray 22. However, if the document sheet D is double sided (i.e., the document sheet D is a duplex sheet), the eject rollers 50 are reversely rotated before the duplex document sheet D is fully ejected so that the other side of the duplex document sheet D may be read by the reader 14 as shown in FIG. 1C. In this case, a back edge of the duplex document sheet D passes by the reader 14 first. As such, the duplex document sheet D can be fed again along the document feed path so that an image from the other side of the duplex document sheet D may be read. Referring to FIG. 1D, when the duplex document sheet D passes by the reader 14 again, the other side of the duplex document sheet D faces the reader 14, and thus, the other side of the duplex document sheet D can be scanned. In this way, images can be read automatically and sequentially from both sides of the duplex document sheet D.

However, if the duplex document sheets D are directly ejected onto the document output tray 22 after both sides of the duplex document sheets D have been scanned, the duplex document sheets D may be stacked on the document output tray 22 in a reverse order when compared to the order in which the duplex document sheets D were initially stacked on the document input tray 20. In other words, in the case of scanning simplex document sheets D, the simplex document sheets D are stacked on the document input tray 20 with front sides of the simplex document sheets D facing up. After scanning one side of the simplex document sheets, the simplex document sheets D are sequentially stacked on the document output tray 22 with the front sides of the simplex document sheets D facing down. Therefore, the simplex document sheets D are stacked in the same initial order as that of when the simplex document sheets D were initially stacked on the document input tray 20 but the simplex document sheets D are upside-down. However, after scanning duplex document sheets D, the duplex document sheets D are stacked on the document output tray 22 with the front sides of the duplex document sheets D facing up since the duplex document sheets D pass by the reader 14 two times as described above. As a result, the stacked order of the duplex document sheets D is reversed after scanning both of the sides, and thus, it is very inconvenient to rearrange the duplex document sheets D in the order in which the duplex document sheets D were initially stacked on the document input tray 20. To stack the duplex document sheets D in the order in which the duplex document sheets D were stacked on the document input tray 20, after scanning both sides of each duplex document sheet D, each duplex document sheet D is fed along the document feed passage one more time as shown in FIG. 1E. Hence, after scanning both sides of each duplex document sheet D, the duplex document sheet D is fed back by the reverse rotation of the eject rollers 50 back into the document feed path across the reader 14 one more time to reverse the duplex document sheet D, and then, the duplex document sheet D is ejected onto the document output tray 22. In this way, the duplex document sheets D are stacked on the document output tray 22 in the same initial stack order that the duplex document sheets D were stacked on the document input tray 20.

However, when the duplex document sheets D have been scanned in this way, it takes substantial time to scan and stack the duplex document sheets D in the correct order as each of the duplex document sheets D must pass by the reader 14 three times. Hence, after a duplex document sheet D passes by the reader 14 three times (two times for scanning and one time for stack-order arrangement), the next duplex document sheet D can be fed, which increases the time required for scanning the duplex document sheets D. Although the increase of scanning time is negligible when one or two duplex document sheets D are scanned, the increase in scanning time cannot be neglected when tens to several hundreds of duplex document sheets D need scanning.

SUMMARY OF THE INVENTION

Aspects of the present invention provide an apparatus to scan a duplex document in a short time and a method of scanning a duplex document using the apparatus. According to an aspect of the present invention, there is provided an apparatus for scanning a duplex document, comprising: a scan unit including a reader which sequentially scans both sides of a sheet of a duplex document by moving the sheet across the reader; and a reverse output unit to receive the sheet from the scan unit after both sides of the sheet have been scanned and to output the sheet after turning over the sheet. The reverse output unit may operate separately from the scan unit.

The scan unit may include: a document input unit to feed the sheet of the duplex document; and a scan side changer to temporarily store the sheet after a first side of the sheet has been scanned by the reader and guiding the sheet back to pass by the reader so that a second side of the sheet faces the reader. The scan side changer may include: a scan side changer tray to temporarily support the sheet after the first side of the sheet has been scanned by the reader; and scan side changer rollers to rotate in a forward direction to feed the sheet to the scan side changer tray after the first side of the sheet has been scanned and to rotate in a reverse direction to feed the sheet back to pass the reader.

In addition, the reverse output unit may comprise: a reverse output tray to temporarily support the sheet after both sides of the sheet have been scanned; a final output tray onto which the sheet is discharged from the reverse output tray; stack side reverse rollers to rotate in a forward direction to move the sheet onto the reverse output tray after both sides of the sheet have been scanned and to rotate in a reverse direction to move the sheet from the reverse output tray to the final output tray; and final output rollers to receive the sheet from the stack side reverse rollers when the stack side reverse rollers rotate in the reverse direction, and to transfer the sheet onto the final output tray. Further, the sheet is turned over between the reverse output tray and the final output tray.

The scan side changer rollers, the stack side reverse rollers, and the final output rollers may be driven by a single motor. The scan side changer roller among the three rollers may be driven by other motors.

To drive the scan side changer rollers, the stack side reverse rollers, and the final output rollers by a single motor, the apparatus may satisfy the following condition: $L1+L2<L3+M$ in which L3 represents a path length between a read point P1 of the reader and a reverse point P2 of the scan side changer rollers, L1 represents a path length between the read point P1 of the reader and a reverse point P3 of the stack side reverse rollers, L1 represents a path length between the reverse point P3 of the stack side reverse rollers and a center of the nip of the final output rollers, and M represents a preset value of an allowable distance between two sheets that sequentially pass the reader.

In addition, the first path guides the sheet to a final output tray of the reverse output unit without turning over the sheet after the first side of the sheet has been scanned when only the first side of the sheet is to be scanned, the second path guides the sheet to a scan side changer of the scan unit in order to scan the second side of the sheet after the first side of the sheet has been scanned when both sides of the sheet are to be scanned, and the third path guides the sheet to a reverse output tray of the reverse output unit in order to turn over the sheet after both sides of the sheet have been scanned.

According to another aspect of the present invention, there is provided a method of scanning a duplex document, comprising: while feeding a sheet of a duplex document into a scan unit and turning over the sheet, sequentially scanning both sides of the sheet using a reader included in the scan unit; and after both sides of the sheet have been scanned, turning over the sheet by feeding the sheet to a reverse output unit operates separately from the scan unit so as to output the sheet of the duplex document in the same initial order that the sheet of the duplex document was originally stacked.

While a second side of the sheet of the duplex document is scanned after a first side of the sheet has been scanned, a next sheet of the duplex document is fed so that the two sheets pass by the reader with a predetermined distance therebetween.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent conjunction with the accompanying drawings of which:

FIG. 2A through 2I are cross-sectional views to illustrate a duplex scanning method using a duplex document scanning apparatus according to an example embodiment of the present invention.

DETAILED DESCRIPTION OF THE EMBODIMENTS

Figure 1A:
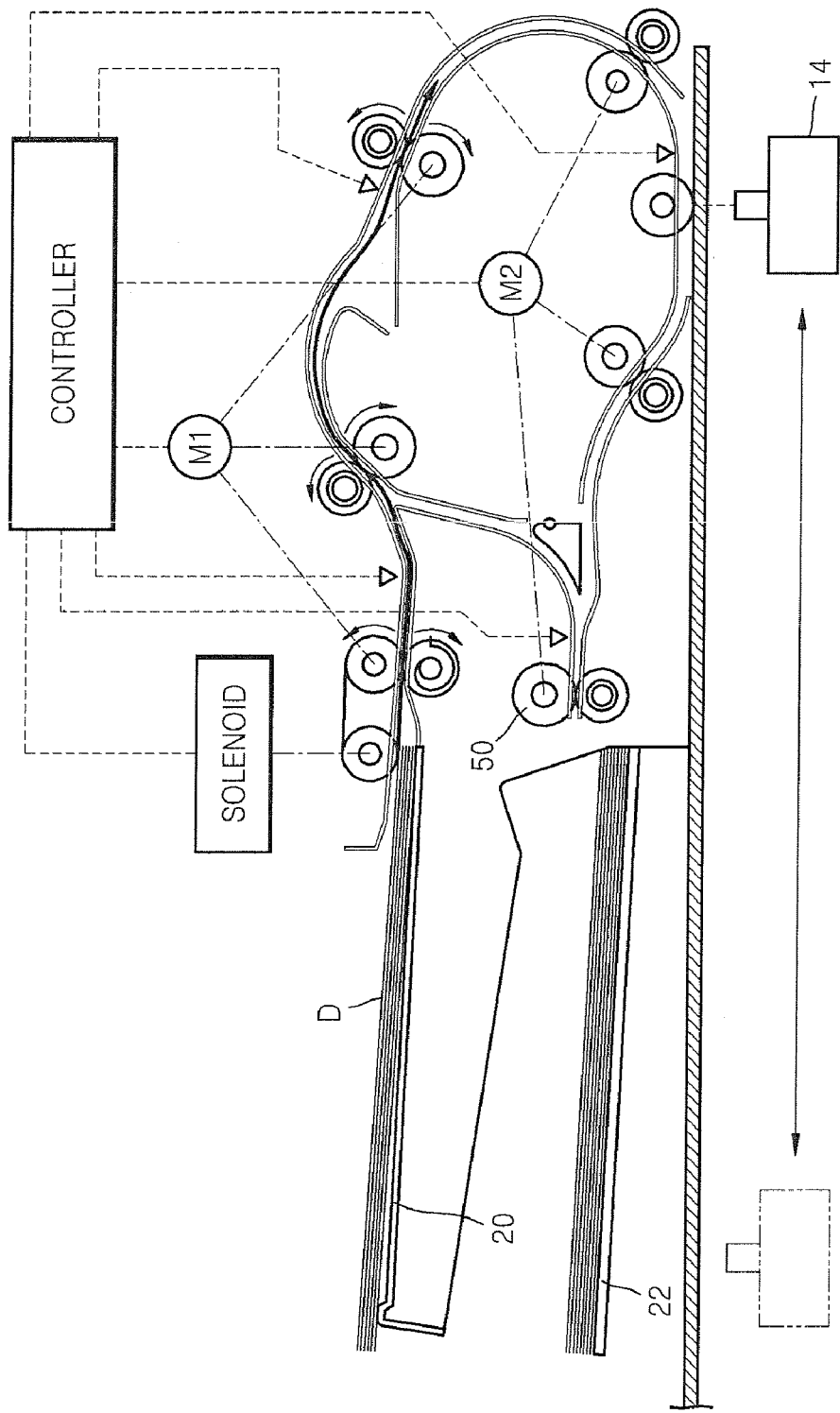
FIGS. 1A through 1E are cross-sectional views to illustrate a duplex scanning method using a conventional duplex document scanning apparatus.
Figure 1B:
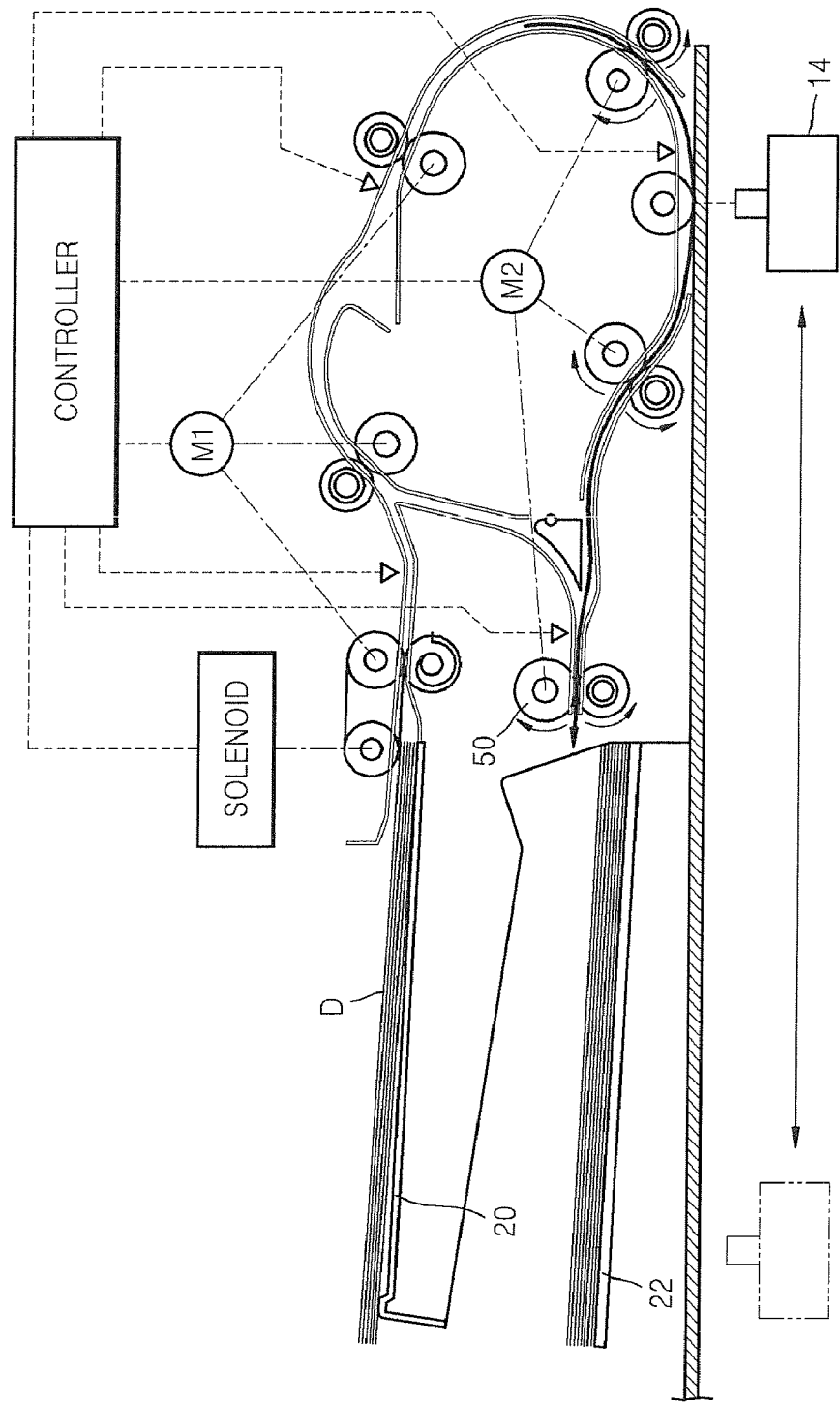
Figure 1C:
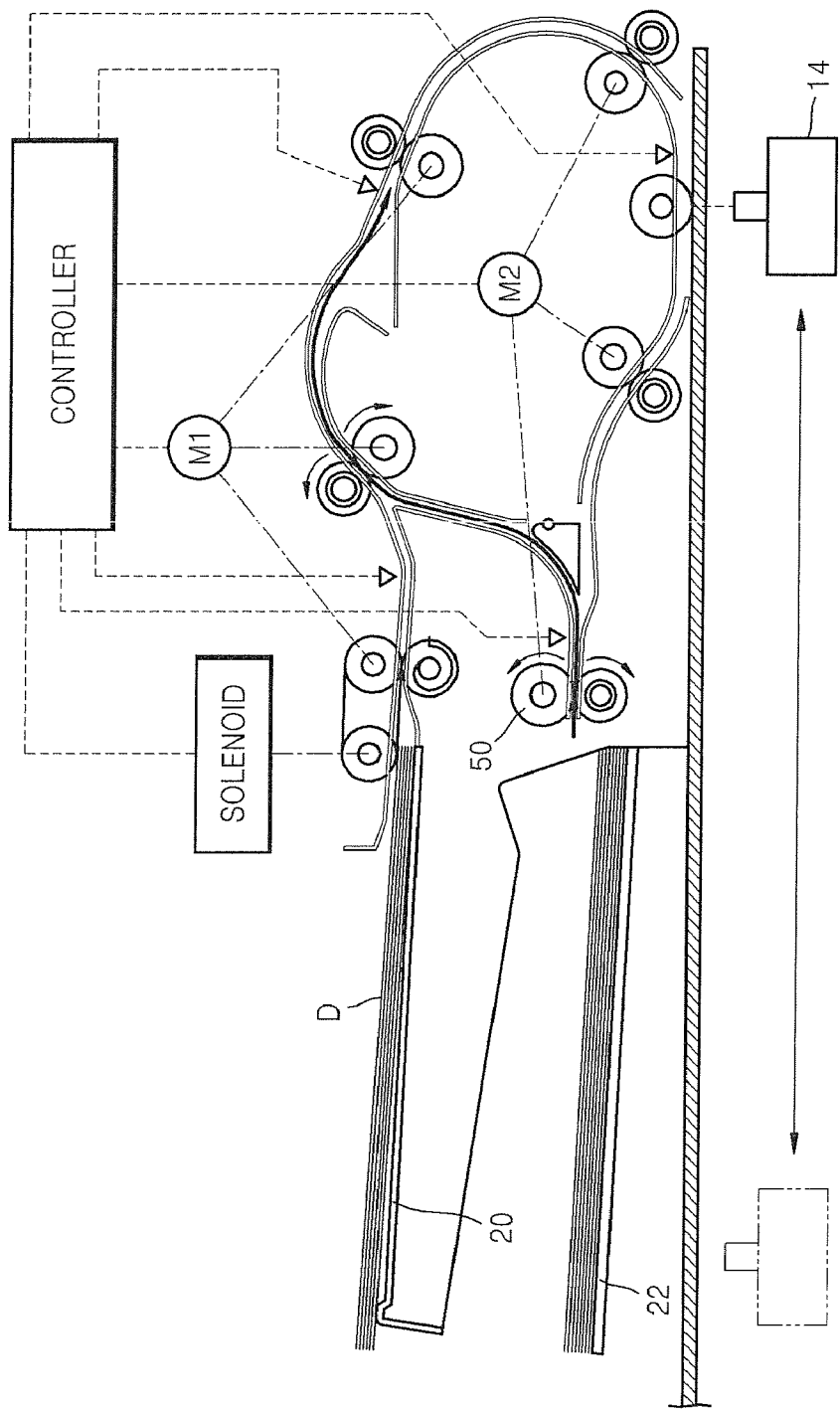
Figure 1D:
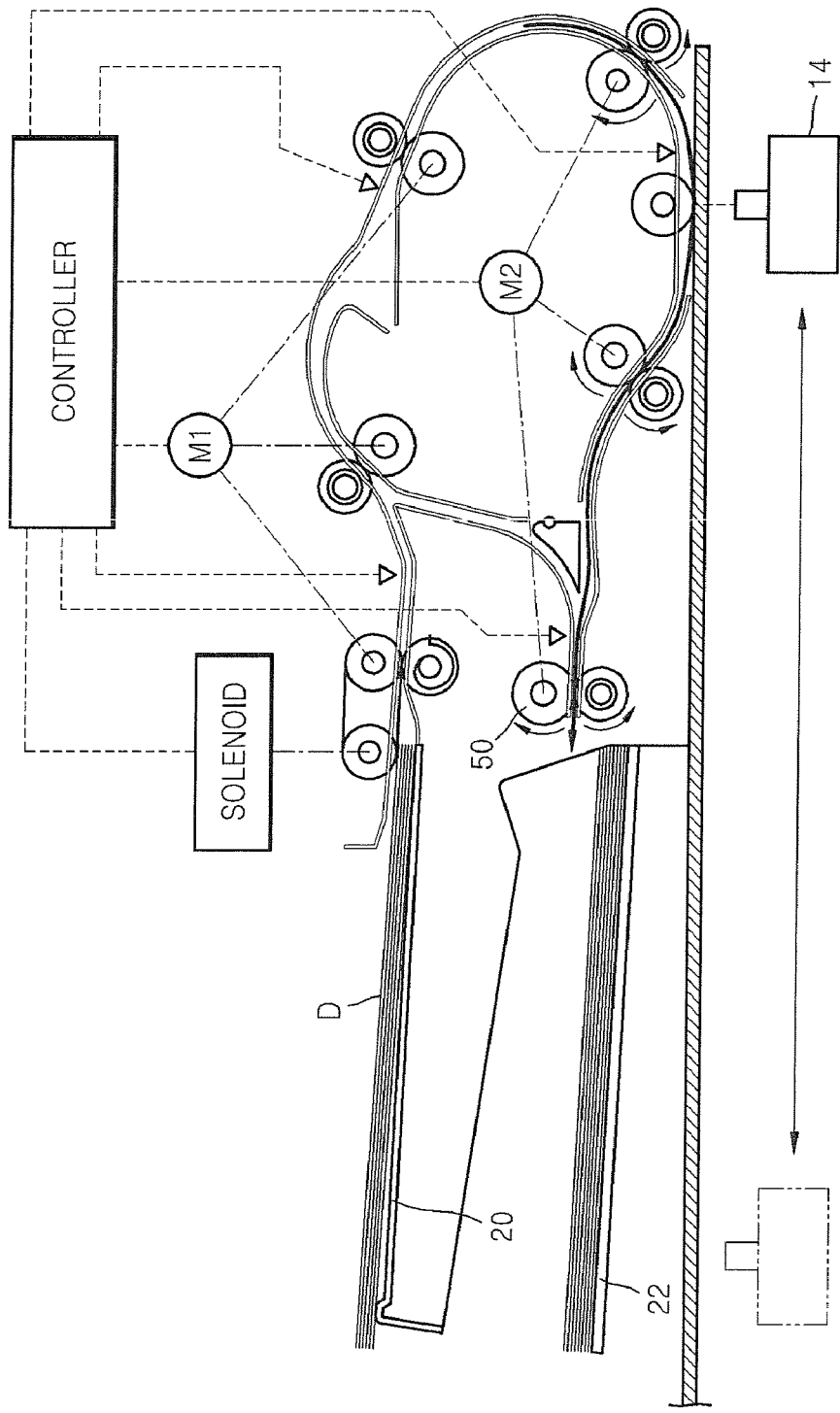
Figure 1E:
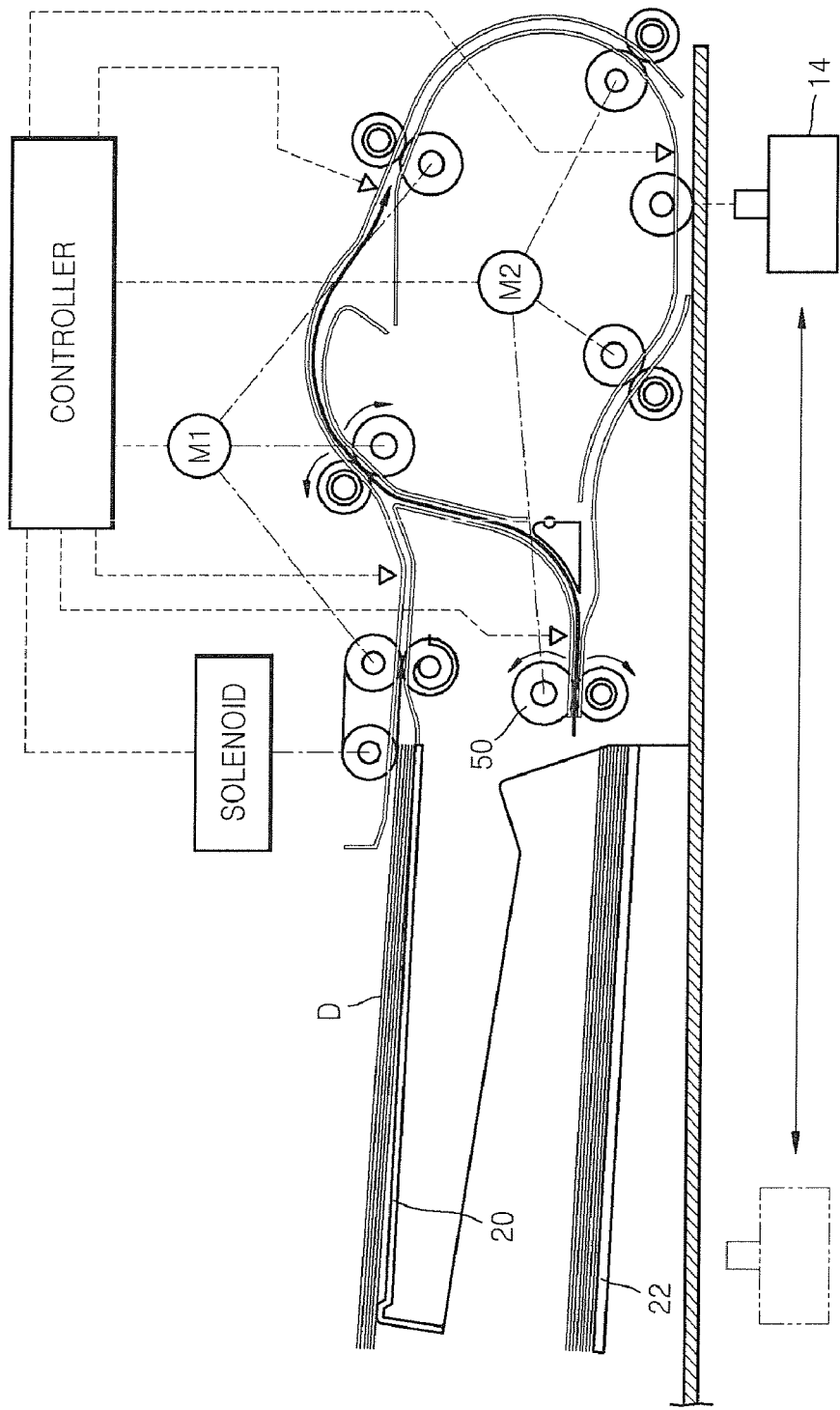

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 2A through 2I are cross-sectional views for explaining a duplex scanning method using a duplex document scanning apparatus, according to an embodiment of the present invention. Although described as a duplex scanning apparatus and a duplex scanning method, aspects of the current invention do not limit this disclosure to only scanning of duplex documents. Specifically, aspects of the current invention provide for the scanning of simplex documents as hereinafter described.

Figure 2A:
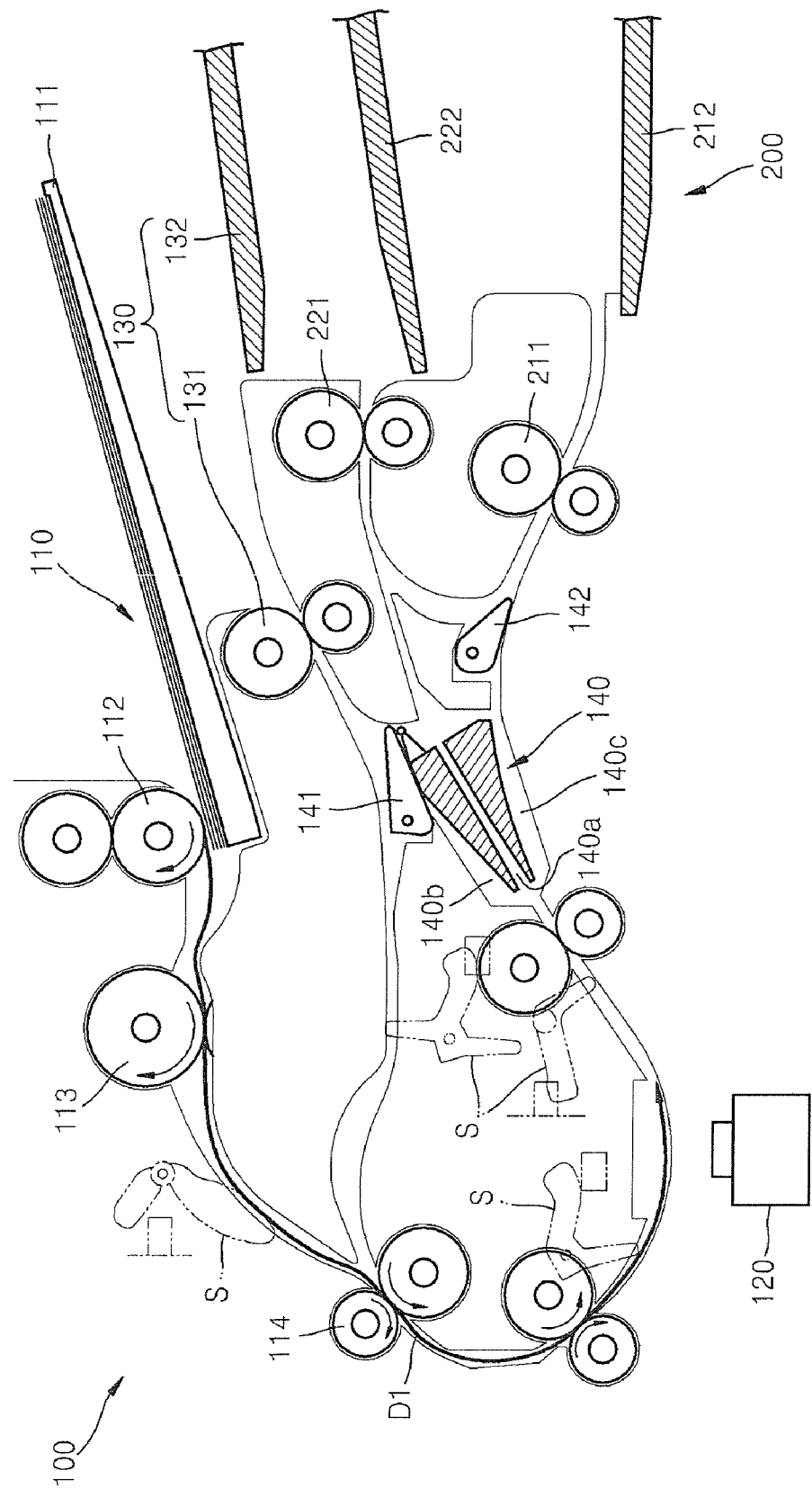

Referring to FIG. 2A, the duplex document scanning apparatus includes a scan unit 100 and a reverse output unit 200 that are adjacent but disposed in different locations. The scan unit 100 sequentially scans both sides of a duplex document sheet. The reverse output unit 200 turns the duplex document sheet over after both sides of the duplex document sheet have been scanned so as to output the duplex document sheet in the same order as the order in which the sheets of the duplex document were stacked on the document tray 111. The reverse output unit 200 turns over the sheet via a path separate from the document feed path of the scan unit 100. In a conventional duplex document scanning apparatus, a duplex document sheet must not be fed to the document feed path until after the previous duplex document sheet is reversed using the document feed path so as to correct the stack order. However, in the duplex document scanning apparatus, the scan unit 100, for duplex scanning, and the reverse output unit 200, for reversing the stack order, are disposed in different locations such that a duplex document sheet can be fed more rapidly after the previous duplex document sheet has been fed. A path selection member 140 is disposed in front of the reverse output unit 200 to guide the document sheets to a path that differs according to a switching position of the path selection member 140 as described later in more detail.

Figure 2B:
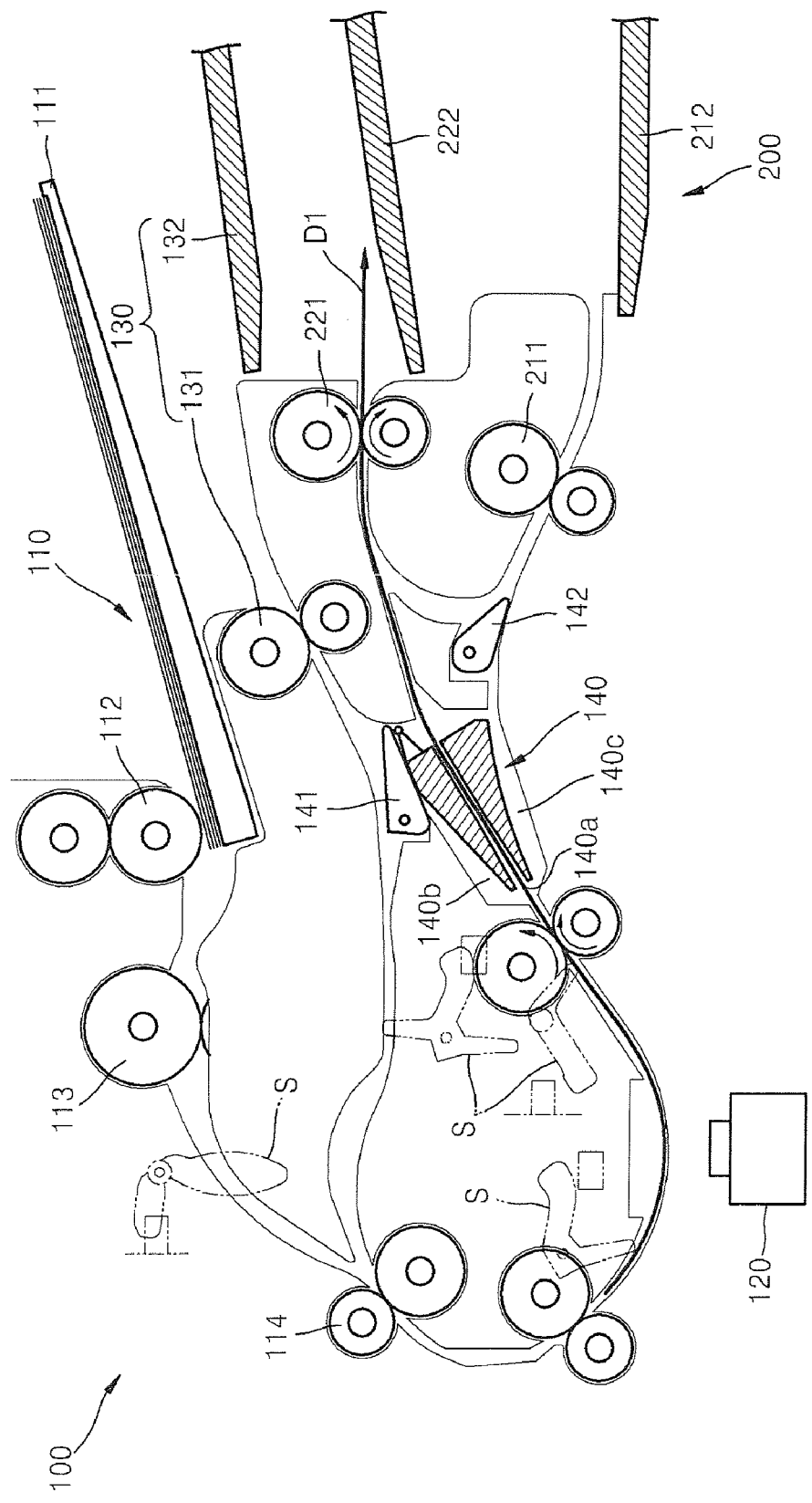

First, the scan unit 100 will now be described in detail. The scan unit 100 may include a document input unit 110, a reader 120, and a scan side changer 130. The document input unit 110 feeds a first sheet D1 of a document into the duplex document scanning apparatus, and the reader 120 scans both sides of the first sheet D1. The scan side changer 130 receives the first sheet D1 after one side of the first sheet D1 has been scanned by the reader 120. Then, the scan side changer 130 feeds the first sheet D1 back to pass by the reader 120 in a manner such that the other side of the first sheet D1 faces the reader 120 and is scanned. In detail, the first sheet D1 is fed from a document input tray 111 of the document input unit 110 into the duplex document scanning apparatus by pick-up rollers 112 and a feed roller 113. In the duplex document scanning apparatus, alignment rollers 114 align a first edge of the first sheet D1, and then one side of the first sheet D1 is scanned while the first sheet D1 passes by the reader 120 as shown in FIG. 2A. If the first sheet D1 is a single-sided sheet (i.e., a simplex sheet), the path selection member 140 may guide the first sheet D1 along a first path 140*a* as shown in FIG. 2B. Hence, if the first sheet D1 is a single-sided or simplex sheet, the first sheet D1 is guided from the reader 120 directly onto a final output tray 222 of the reverse output unit 200 along the first path 140*a*. In the case of scanning a simplex document, sheets of the simplex document can be fed at predetermined time intervals in a manner such that a sheet of the simplex document can be fed while the previous sheet of the simplex document is scanned.

Figure 2C:
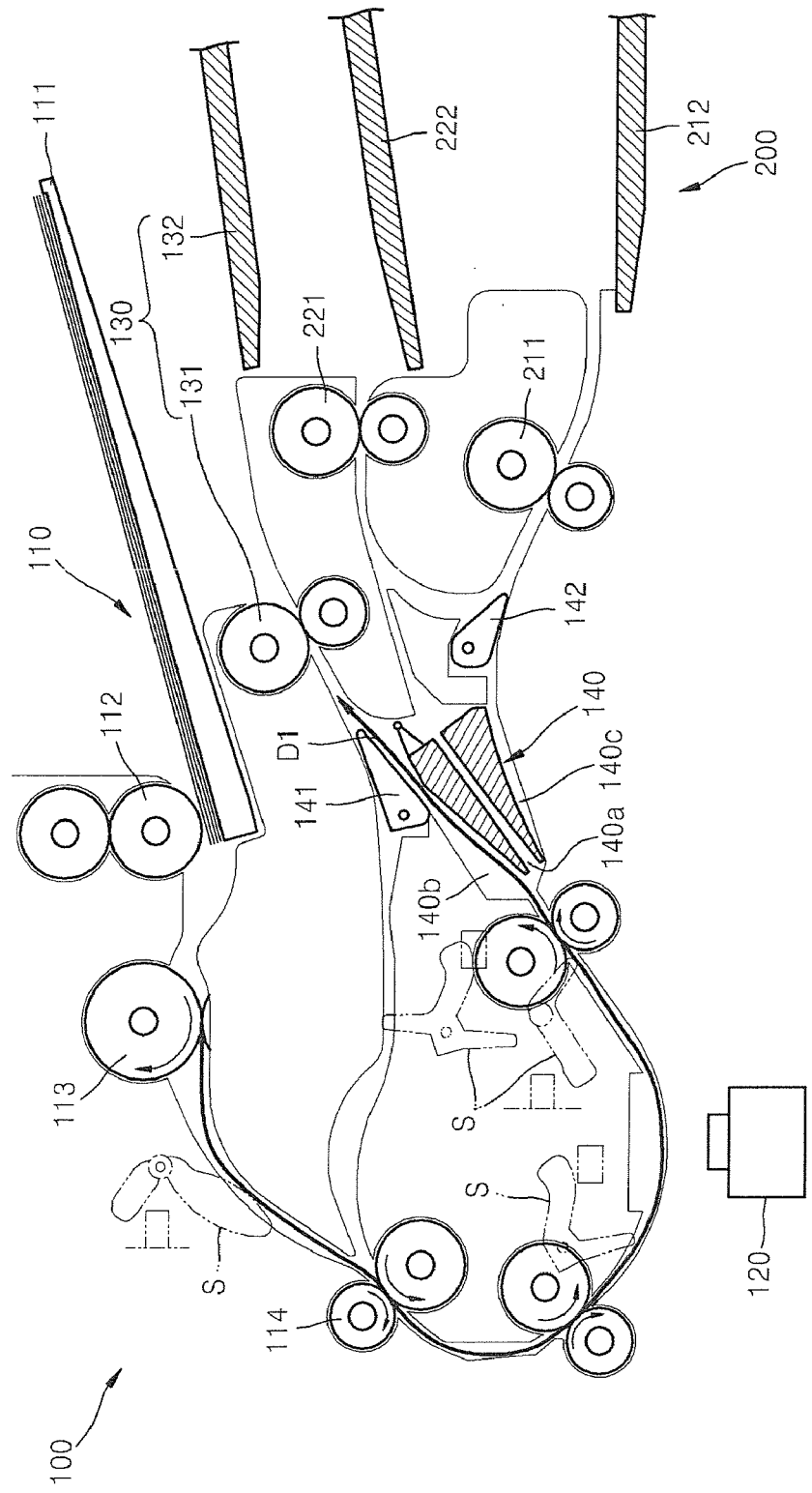
Figure 2D:
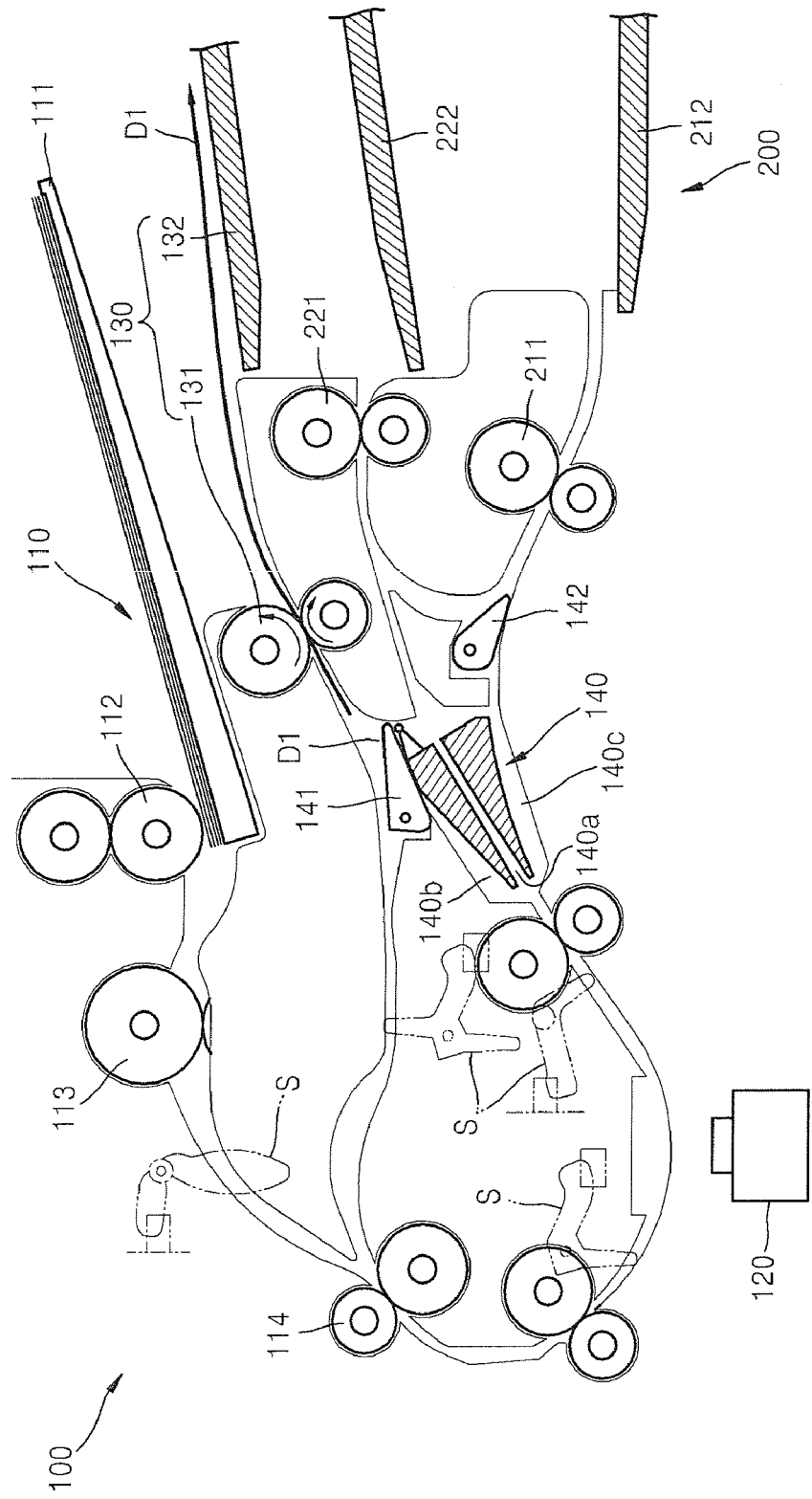
Figure 2E:
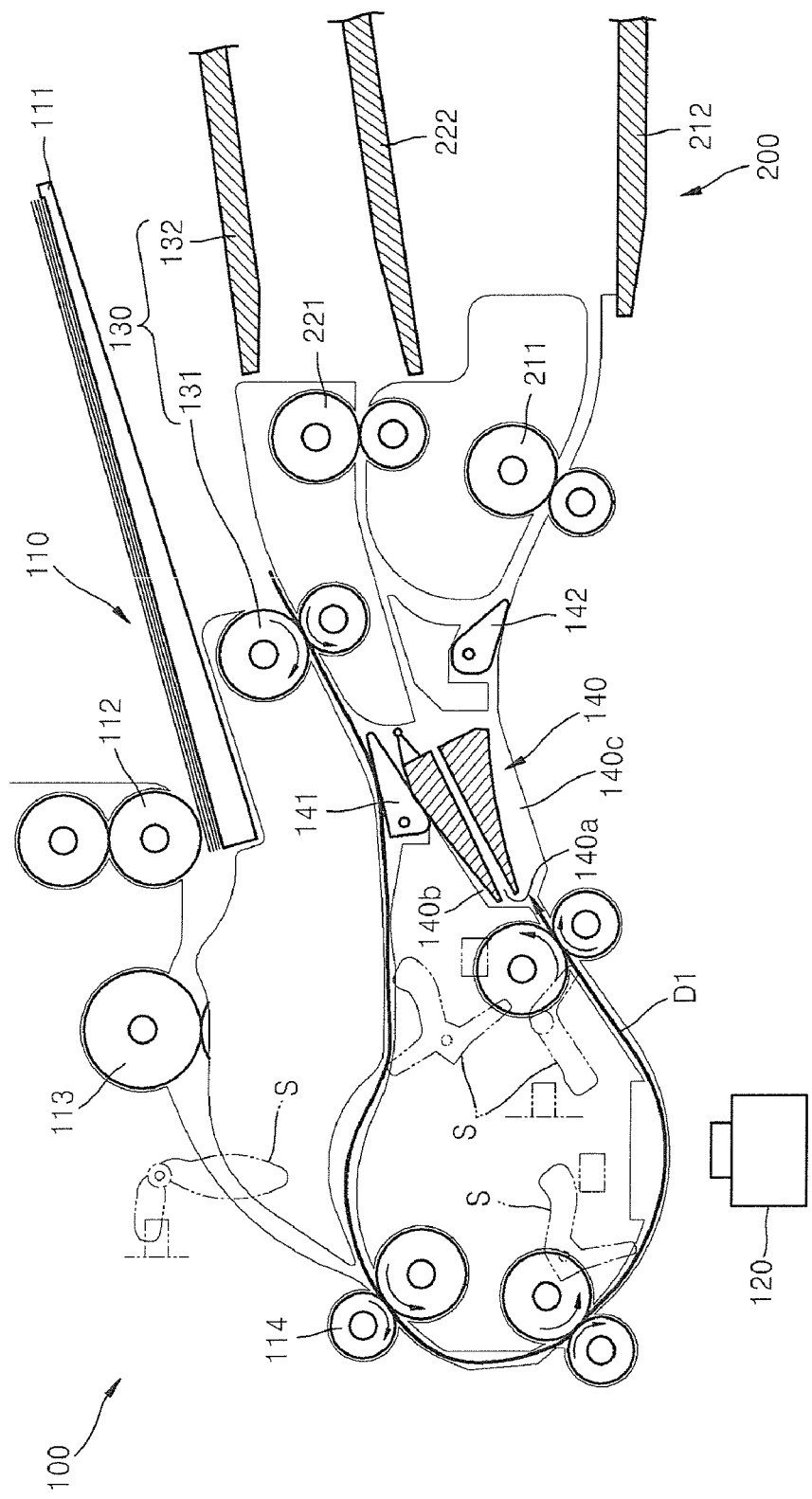

However, if the first sheet D1 is a duplex sheet, the first sheet D1 is guided to the scan side changer 130 along a second path 140*b* by the path selection member 140 after one side of the first sheet D1 has been scanned by the reader 120 as shown in FIG. 2C. Then, as shown in FIG. 2D, the first sheet D1 is temporarily discharged to a scan side changer tray 132 by scan side changer rollers 131 of the scan side changer 130. Thereafter, the first sheet D1 is guided back to pass by the reader 120 when the scan side changer rollers 131 rotate in a reverse direction. As such, a second edge of the first sheet D1 reaches the reader 120 first with the other side of the first sheet D1 facing the reader 120 as shown in FIG. 2E. In this way, the other side of the first sheet D1 can be scanned. Additionally, the duplex document scanning apparatus includes a path switch lever 141. When the first sheet D1 is received by the scan side changer 130 after one side of the first sheet D1 has been scanned, the path switch lever 141 is rotated counter-clockwise by a first edge of the first sheet D1 as shown in FIG. 2C as the first sheet D1 passes between the path switch lever 141 and the path selection member 140 to be temporarily supported on the scan side changer tray 132. After the first sheet D1 has passed by the path switch lever 141, the path switch lever 141 rotates clockwise due to gravity to its original position as shown in FIG. 2D. Thus, when the scan side changer rollers 131 rotate in a reverse direction, the first sheet D1 can be guided, with the second edge of the first sheet D1 leading, to the reader 120 through the alignment rollers 114 by the path switch lever 141 as shown in FIG. 2E. However, the path switch lever 141 is not limited thereto. The path switch lever 141 may rotate and guide the document sheets mechanically or otherwise. Further, the path switch lever 141 may operate to indicate a location of the first and second sheets D1 and D2.

Figure 2F:
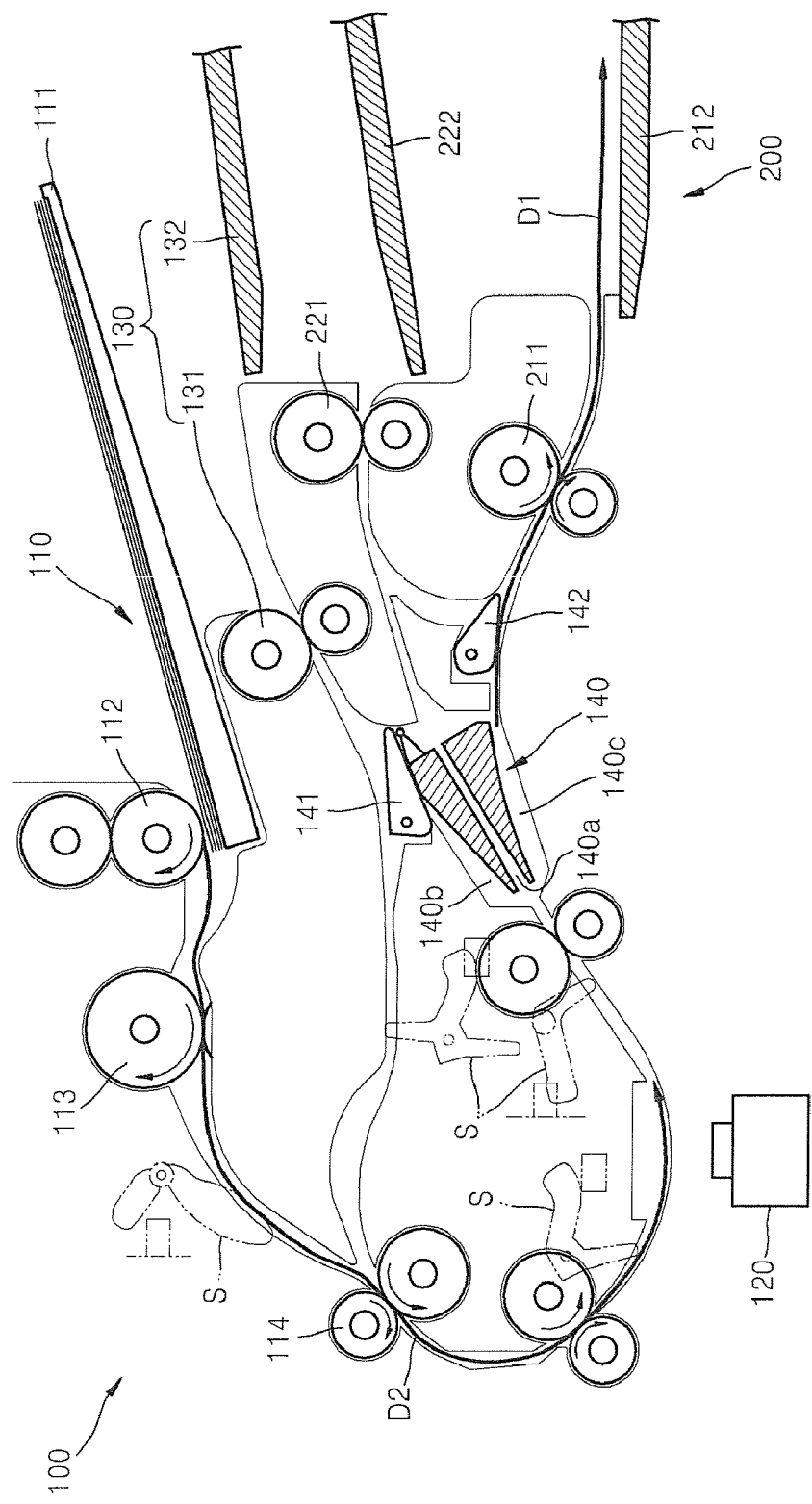

First edge and second edge are used herein to describe the edges of the document sheets with respect to the initial motion of the document sheets such that the first edge is the first edge to cross a specific point along the document feed path in the first pass across the reader 120. For example, in FIG. 2C, the first edge of the first sheet D1 pushes against the path switch lever 141 after having been guided through the second path 140*b* by the path selection member 140 to be partially ejected to the scan side changer tray 132 by scan side changer rollers 131 of the scan side changer 130. Before the scan side changer rollers 131 release the second edge of the first sheet D1, the scan side changer rollers 131 reverse direction to feed the first sheet D1 back to the reader 120. As such, the second edge of the first sheet D1 is now guided by the path switch lever 141 back to the document feed path so that the other side of the first sheet D1 is scanned by the reader 120 as shown in FIG. 2E. The second edge of the first sheet D1 is then guided through the third path 140*c* by the path selection member 140 to the reverse output unit 200. The first sheet D1 is then partially ejected to the reverse output tray 212, and the stack reverse rollers 211 reverse direction before releasing the first edge of the first sheet D1 as shown in FIG. 2F. The first edge of the first sheet D1 is then guided by the path switch lever 142 to the final output rollers 221 to completely eject the first sheet D1 to stack the sheet D1 on the final output tray 222 in the proper order as shown in FIGS. 2G and 2H.

Referring to FIG. 2E, after the other side of the first sheet D1 has been scanned as described above, the first sheet D1 is discharged from the scan unit 100 to the reverse output unit 200 along a third path 140*c* of the path selection member 140. Thereafter, the first sheet D1 is turned over by the reverse output unit 200 so that the first sheet D1 can be stacked on the reverse output unit 200 in the same order as the order in which the first sheet D1 was stacked on the document input unit 110. Since the first sheet D1 is reversed by the reverse output unit 200, which does not use the document feed path, one side of the next or second sheet D2 can be scanned without any interference by the reversing motion of the previous first sheet D1. Therefore, referring to FIG. 2F, when the first sheet D1 is guided to the reverse output unit 200, the next second sheet D2 can be fed into the scan unit 100 for the front or first side of the second sheet D2 to be scanned. After the second edge of the first sheet D1 has passed by the reader 120 after scanning the back or other side of the first sheet D1, the next second sheet D2 can pass by the reader 120 with its first edge at a predetermined distance from an edge of the first sheet D1. For example, as the first sheet D1 has passes the reader 120 traveling with the second edge first, the first edge of the second sheet D2 can pass the reader 120 to scan the first side of the second sheet D2 at a distance of about 90 to 140 mm behind the first edge of the first sheet D1 as the first sheet D1 travels having the second edge first.

Figure 2G:
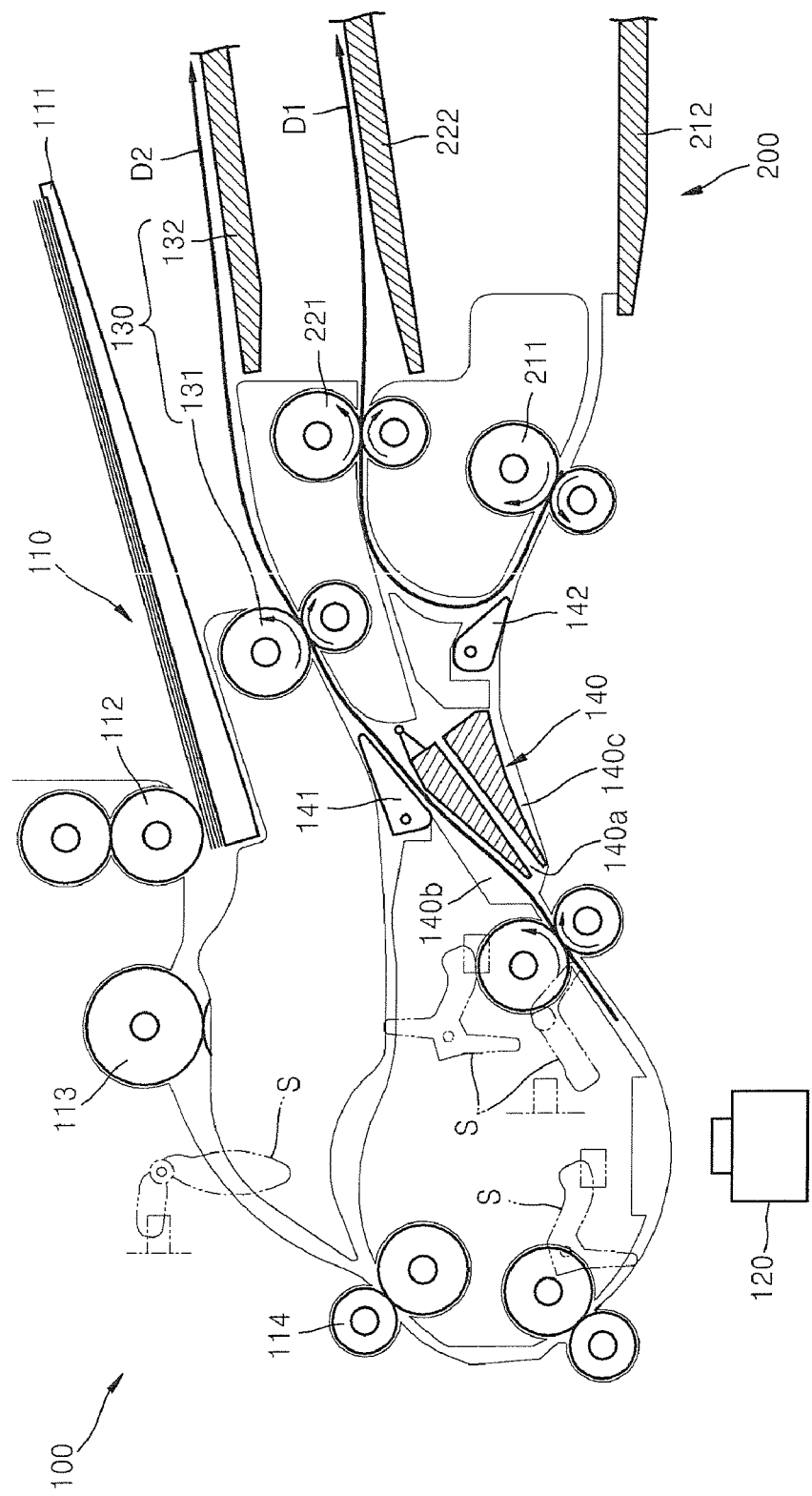
Figure 2I:
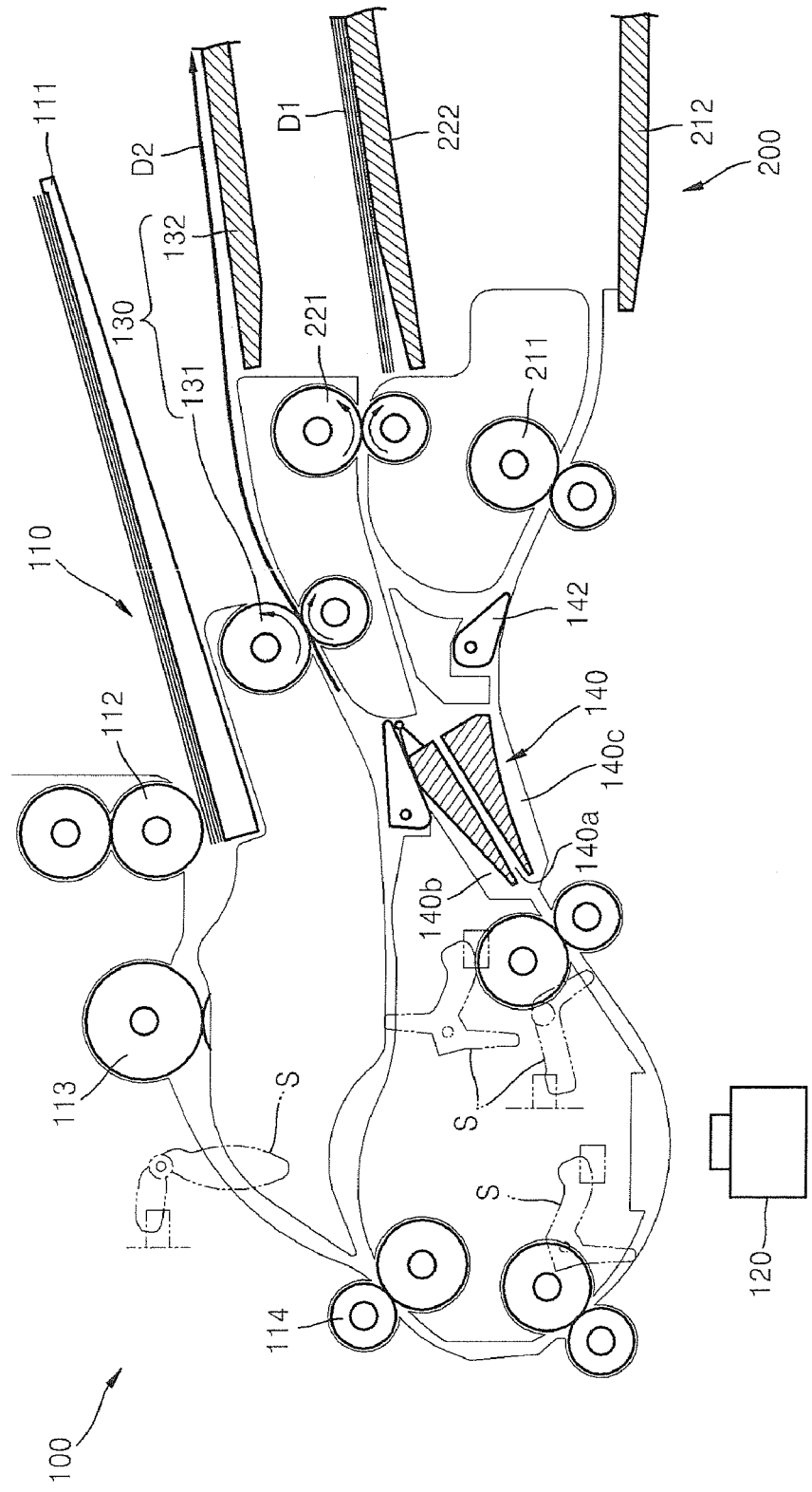

In the reverse output unit 200, the first sheet D1 is temporarily discharged or partially ejected to a reverse output tray 212 after the back or other side of the first sheet D1 has been scanned and is guided to the final output tray 222 through final output rollers 221 by a reverse rotation of stack side reverse rollers 211 as shown in FIG. 2G. A path switch lever 142 guides the first sheet D1 to the final output tray 222. The path switch lever 142 may operate to indicate a location of the first sheet D1. At this time also, the second sheet D2 is temporarily discharged or partially ejected to the scan side changer tray 132 by the scan side changer rollers 131 as shown in FIG. 2G. Then, after the first sheet D1 has been completely discharged to the final output tray 222, the second sheet D2 is guided back to pass by the reader 120 by a reverse rotation of the scan side changer rollers 131 as shown in FIGS. 2H and 2I, so that the back or other side of the second sheet D2 can be scanned, and thus, both sides of remaining sheets of the document can be scanned by repeating the above-described operations. In a conventional duplex document scanning apparatus, a duplex document sheet is fed after the previous duplex document sheet has finally reversed. However, in the duplex document scanning apparatus, a duplex document sheet (the second sheet D2) can be fed to the scan unit 100 while the other side of the previous duplex document sheet (the first sheet D1) is scanned, and thus, the duplex document can be scanned more rapidly. In the drawings, the duplex document scanning apparatus according to aspects of the present invention includes sensors S used to detect the location of a document sheet along the paths so that each roller may be rotated at a desired time.

A duplex scanning method using the duplex document scanning apparatus according to aspects of the present invention will now be described in more detail. Referring to FIG. 2A, the pick-up rollers 112 pick up the first sheet D1 from the document input tray 111. The first sheet D1 passes by the feed roller 113, and then, the alignment rollers 114 align the first edge of the first sheet D1. Thereafter, the first sheet D1 passes by the reader 120, and one side of the first sheet D1 is scanned as shown in FIG. 2C. Then, the first sheet D1 is temporarily discharged or partially ejected to the scan side changer tray 132 of the scan side changer 130 as shown in FIG. 2D. Then, the first sheet D1 is fed back to pass by the reader 120 by a reverse rotation of the scan side changer rollers 131, and the reader 120 scans the other side of the first sheet D1 as shown in FIG. 2E. While the other side of the first sheet D1 is scanned, the next or second sheet D2 is fed at a predetermined distance away from the first sheet D1. As a result, referring to FIG. 2F, while the first sheet D1 is discharged to the reverse output unit 200, one side of the second sheet D2 can be scanned. In the reverse output unit 200, the first sheet D1 is temporarily discharged or partially ejected to the reverse output tray 212 and then is finally discharged to the final output tray 222 by a reverse rotation of the stack side reverse rollers 211. Thus, after one side of the second sheet D2 has been scanned, the second sheet D2 is guided to the scan side changer 130 as shown in FIGS. 2G through 2I. Thereafter, the second sheet D2 is guided back to pass by the reader 120 to scan the other side of the second sheet D2. In this way, a time delay between the scanning of sheets of a duplex document can be decreased, and thus, duplex document sheets can be scanned more rapidly.

Herein, the forward rotation of the rollers or the rollers rotating in the forward direction results in the discharge or ejection, partial or complete, of the document sheet to one of the trays. The reverse rotation of the rollers or the rollers rotating in the reverse direction results in the delivery of the document sheet to the scan unit 100 or the reverse output unit 200 as the case may be. For example, when the scan side changer rollers 131 rotate in the forward direction, the scan side changer rollers 131 guide a document sheet to the scan side changer tray 132. In order to partially eject the document sheet, the scan side changer rollers 131 eject or release the document sheet to the scan side changer tray. As such, the scan side changer rollers 131 rotate in the reverse direction to guide the document sheet back to the scan unit 100.

The stack side reverse rollers 211 and the final output rollers 221 of the reverse output unit 200, and the scan side changer rollers 131 of the scan side changer 130 can be driven by a single motor. Alternatively, the stack side reverse rollers 211, the final output rollers 221, and the scan side changer rollers 131 can be driven by separate motors. However, in the latter case, the duplex document scanning apparatus may include more components and may become bulky. Meanwhile, in the former case, the stack side reverse rollers 211, the final output rollers 221, and the scan side changer rollers 131 can be rotated by a single motor using gears. As the stack side reverse rollers 211, the final output rollers 221, and the scan side changer rollers 131 are rotated in preset directions according to a rotation of a motor, sheets of a document are fed in a predetermined manner. That is, when the stack side reverse rollers 211, the final output rollers 221, and the scan side changer rollers 131 are rotated as shown in FIG. 2G, the first sheet D1 is moved to the final output tray 222 from the reverse output tray 212, and the second sheet D2 is partially ejected to the roller tray 132. To do so, the stack side reverse rollers 211, the final output rollers 221, and the scan side changer rollers 131 are interconnected by gears in a manner such that the stack side reverse rollers 211, the final output rollers 221, and the scan side changer rollers 131 are rotated in preset directions by the single motor according to the movements of the first and second sheets D1 and D2. Hence, as the stack side reverse rollers 211, the final output rollers 221, and the scan side changer rollers 131 are rotated by the single motor, the stack side reverse rollers 211, the final output rollers 221, and the scan side changer rollers 131 are rotated simultaneously in the case where the stack side reverse rollers 211, the final output rollers 221, and the scan side changer rollers 131 are rotated in directions shown in FIG. 2G or opposite directions to those as shown in FIG. 2G. The scan side changer rollers 131 and the final output rollers 221, when driven by the single motor, rotate in one of the forward rotation and the reverse rotation while the stack side reverse rollers 211 rotate in the other of the forward rotation and the reverse rotation.

Therefore, as shown in FIG. 2F, when the stack side reverse rollers 211 are rotated in directions opposite to the directions as shown in FIG. 2G, a first requirement for efficient duplex scanning while operating the stack side reverse rollers 211, the final output rollers 221, and the scan side changer rollers 131 with the single motor scanning is that the second sheet D2 must not reach the scan side changer rollers 131 while the first sheet D1 is being partially ejected to the stack side reverse tray 212 as the scan side changer rollers 131 are rotated in the reverse direction such that the second sheet D2 would not be guided to the scan side changer tray 132 by the scan side changer rollers 131. Another way to express the first requirement is that the second sheet D2 cannot reach the scan side changer rollers 131 until the stack side reverse rollers 211 and the scan side changer rollers 131 have reversed rotation directions so that when the second sheet D2 reaches the scan side changer rollers 131 the scan side changer rollers 131 are rotating in the forward direction and the stack side reverse rollers 211 are rotating in the reverse direction when the scan side changer rollers 131 and the stack side reverse rollers 211 are operated by the single motor.

In addition, as shown in FIG. 2H, a second requirement for efficient duplex scanning while operating the stack side reverse rollers 211, the final output rollers 221, and the scan side changer rollers 131 with the single motor is that the second edge of the second sheet D2 is disposed between the scan side changer rollers 131 until the first sheet D1 is fully released from the final output rollers 221. Or another expression of the second requirement is that the final output rollers 221 and the scan side changer rollers 131 continue to rotate in the forward rotation at least until the first sheet D1 is fully ejected to the final output tray 222 while the scan side changer rollers maintain contact with the second sheet D2 so that the second sheet D2 is only partially ejected to the scan side changer tray 132 when the final output rollers 221 and the scan side changer rollers 131 are operated by a single motor.

Figure 3:
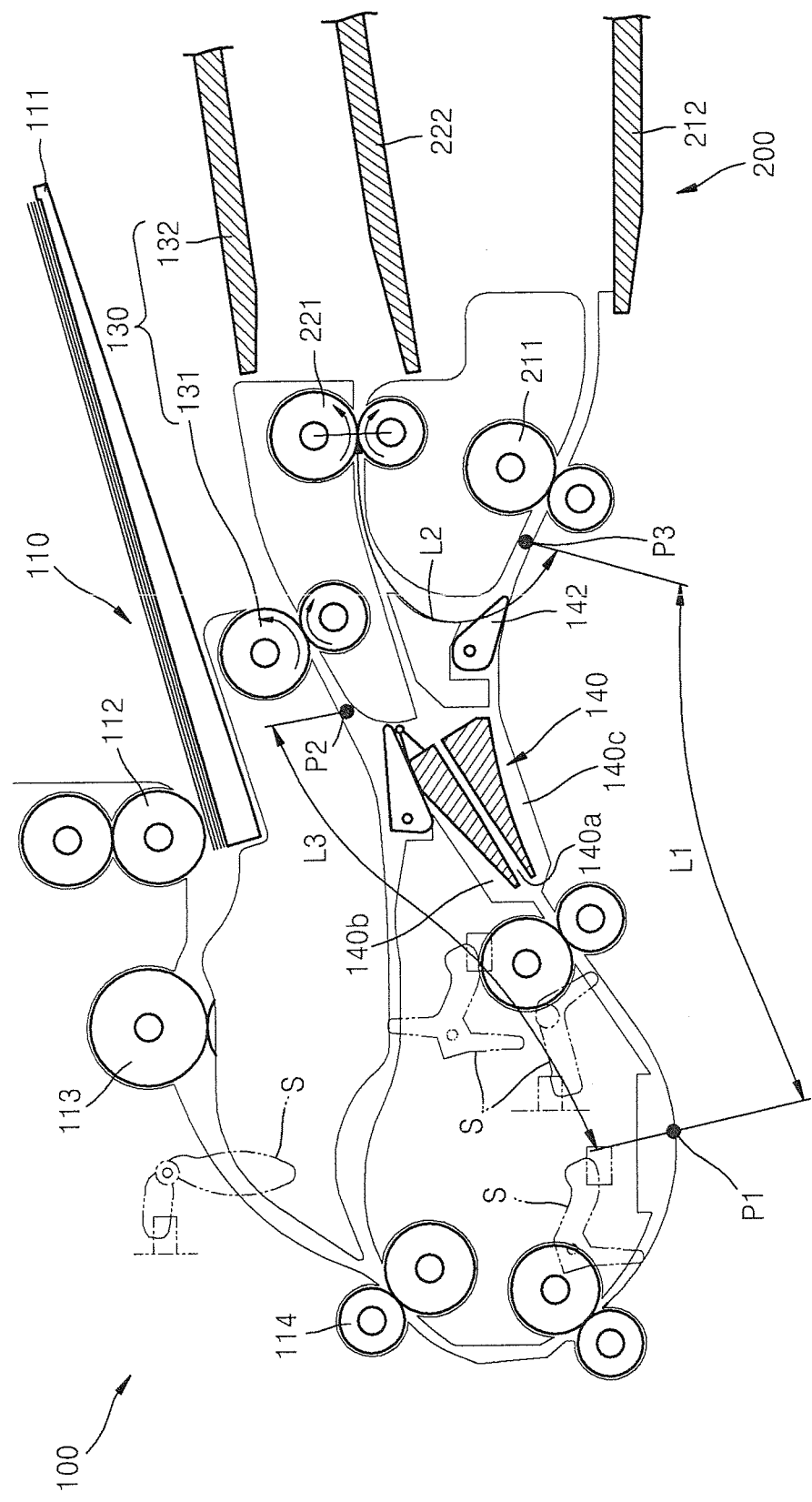
FIG. 3 is a cross-sectional view to illustrate a method of reducing the number of motors in the duplex document scanning apparatus depicted in FIGS. 2A through 2I, according to another example embodiment of the present invention.

The first and second requirements will now be more fully described with reference to FIG. 3. FIG. 3 is a cross-sectional view to illustrate a method of reducing the number of motors in the duplex document scanning apparatus depicted in FIGS. 2A through 2I.

A length L3 is a path length between a read point P1 of the reader 120 and a reverse point P2 of the scan side changer rollers 131. A length L1 is a path length between the read point P1 of the reader 120 and a reverse point P3 of the stack side reverse rollers 211. A length L2 is a path length between the reverse point P3 of the stack side reverse rollers 211 and a center of the nip of the final output rollers 221. The reverse points P2 and P3 denote points where an edge of a sheet is located when the scan side changer rollers 131 and the final output rollers 221 start to rotate in a reverse direction.

The first requirement can be satisfied such that $L1<L3+M$, where M represents a preset value of an allowable distance between the first and second sheets D1 and D2 that sequentially pass the reader 120. According to the first requirement expressed by the condition as described above, the second sheet D2 does not reach the scan side changer rollers 131 when the first sheet D1 is being partially discharged to the reverse output tray 212.

The second requirement can be satisfied such that L1+L2+LD<L3+M+LD, where LD represents the length of document sheets. According to the second requirement, the scan side changer rollers 131 maintain contact with the second sheet D2 while the first sheet D1 is fully released from the final output rollers 221.

The first and second requirements can be expressed by combining the above-described formulas resulting in a combined condition: L1+L2<L3+M. The second requirement wholly includes the first requirement as the sum of the lengths L1+L2 is not less than the length L3+M unless the length L1 is less than the length L3+M as L1, L2, L3, and M are all positive numbers. Hence, the stack side reverse rollers 211, the final output rollers 221, and the scan side changer rollers 131 can be driven using a single motor according to the above-described combined condition.

Alternatively, the scan side changer rollers 131 can be driven using a first motor, and the stack side reverse rollers 211 and the final output rollers 221 can be driven using a second motor. In such case, the first and second requirements may be not necessary, and thus, a higher degree of design freedom can be achieved. However, as explained above, when the scan side changer rollers 131, the stack side reverse rollers 211, and the final output rollers 221 are driven using a single motor, the number of components and the weight of the duplex document scanning apparatus can be reduced.

As described above, the duplex document scanning apparatus and the duplex document scanning method provide the following and/or other advantages: Scanning time of a duplex document can be reduced as a sheet of the document can be fed while the second side of the previous sheet of the document is scanned. Particularly, the reduction in scanning time is very useful when a number of sheets of a duplex document need to be scanned. Also, the second side of the second sheet can be scanned while the first sheet is being turned over to result in a proper stacking order. Furthermore, since the three sets of rollers can be driven using a single motor, the duplex document scanning apparatus can be smaller and lighter.

Although a few embodiments of the present invention have been shown and described, it would be appreciated by those skilled in the art that changes may be made in these embodiments without departing from the principles and spirit of the invention, the scope of which is defined in the claims and their equivalents. For example, the duplex scanning apparatus and a duplex scanning method, according aspects of the current invention, are not limited by this disclosure to only scanning of duplex documents. Specifically, aspects of the current invention provide for the scanning of simplex documents. Further, different elements as disclosed above may be plurally provided for so as to increase efficiency in scanning.

What is claimed is:

1. A duplex document scanning apparatus comprising:
    a scan unit including a reader, the scan unit sequentially scans images of both sides of a sheet by moving the sheet across the reader; and
    a reverse output unit to receive the sheet from the scan unit after the images of both sides of the sheet have been scanned and to output the sheet after turning over the sheet,
    wherein the scan unit comprises:
        a document input unit to feed the sheet of the duplex document; and
        a scan side changer to temporarily store the sheet after a first side of the sheet has been scanned by the reader and to guide the sheet back to pass the reader so that a second side of the sheet faces the reader,
    wherein the reader scans both sides of the sheet fed from the document input unit,
    wherein the scan side changer comprises:
        a scan side changer tray to temporarily support the sheet after the first side of the sheet has been scanned by the reader; and
        scan side changer rollers to rotate in a forward direction to feed the sheet to the scan side changer tray after the first side of the sheet has been scanned and to rotate in a reverse direction to feed the sheet back to pass the reader, and
    wherein the reverse output unit comprises:
        a reverse output tray to temporarily support the sheet after both sides of the sheet have been scanned;
        a final output tray onto which the sheet is discharged from the reverse output tray;
        stack side reverse rollers to rotate in a forward direction to move the sheet onto the reverse output tray after both sides of the sheet have been scanned and to rotate in a reverse direction to move the sheet from the reverse output tray to the final output tray; and
        final output rollers to receive the sheet from the stack side reverse rollers when the stack side reverse rollers rotate in the reverse direction and to transfer the sheet onto the final output tray,
    wherein the sheet is turned over between the reverse output tray and the final output tray.

2. The apparatus of claim 1, wherein the scan side changer rollers, the stack side reverse rollers, and the final output rollers are driven by a single motor.

3. The apparatus of claim 2, wherein the following condition is satisfied:
    $L1+L2<L3+M$ where L3 represents a path length between a read point P1 of the reader and a reverse point P2 of the scan side changer rollers, L1 represents a path length between the read point P1 of the reader and a reverse point P3 of the stack side reverse rollers, L1 represents a path length between the reverse point P3 of the stack side reverse rollers and a center of a nip of the final output rollers, and M represents a preset value of an allowable distance between two sheets that sequentially pass the reader.

4. The apparatus of claim 3, wherein the allowable distance is about 90 to 140 mm.

5. The apparatus of claim 2, wherein the single motor selectively rotates the scan side changer rollers and the final output rollers in one of the forward direction and the reverse direction, and the single motor rotates the stack side changer rollers in the other of the forward direction and the reverse direction.

6. The apparatus of claim 1, wherein the scan side changer rollers, the stack side reverse rollers, and the final output rollers are driven by separate motors.

7. A duplex document scanning apparatus comprising:
    a scan unit including a reader, the scan unit sequentially scans images of both sides of a sheet by moving the sheet across the reader; and
    a reverse output unit to receive the sheet from the scan unit after the images of both sides of the sheet have been scanned and to output the sheet after turning over the sheet,
    wherein the reverse output unit comprises:

a reverse output tray to temporarily support the sheet after both sides of the sheet have been scanned;

a final output tray onto which the sheet is discharged from the reverse output tray;

stack side reverse rollers to rotate in a forward direction to move the sheet to the reverse output tray after both sides of the sheet have been scanned and to rotate in a reverse direction to move the sheet from the reverse output tray to the final output tray; and final output rollers to receive the sheet from the stack side reverse rollers when the stack side reverse rollers rotate in the reverse direction and to transfer the sheet onto the final output tray, wherein the sheet is turned over between the reverse output tray and the final output tray.

8. The apparatus of claim 7, further comprising a path selection member disposed in front of the reverse output unit to guide the sheet along one of first through three paths, wherein the first path guides the sheet to the final output tray of the reverse output unit without turning over the sheet after the first side of the sheet has been scanned when only one side of the sheet is to be scanned, the second path guides the sheet to a scan side changer of the scan unit in order to scan the second side of the sheet after the first side of the sheet has been scanned when both sides of the sheet are to be scanned, and the third path guides the sheet to a reverse output tray of the reverse output unit in order to turn over the sheet after both sides of the sheet have been scanned.

9. The apparatus of claim 8, further comprising a path switch lever disposed in the second path, wherein the path switch lever allows the sheet to pass to the scan side changer and then guides the sheet to the reader of the scan unit to scan the other side of the sheet.

10. The apparatus of claim 7, wherein the duplex document comprises a plurality of duplex sheets, and the reverse output unit stacks the duplex document in an original order in which the duplex document was initially stacked.

11. The apparatus of claim 7, further comprising at least a sensor disposed in at least the scan unit to detect a location of the sheet.

12. The apparatus of claim 7, wherein the reverse output unit operates separately from the scan unit.

13. A method of scanning a duplex document, comprising:
feeding a sheet of a duplex document into a scan unit;
sequentially scanning both sides of the sheet using a reader included in the scan unit;
turning over the sheet by feeding the sheet to a reverse output unit separate from the scan unit; and
outputting the turned-over sheet in a same initial order in which the sheet of the duplex document was originally stacked,
wherein the scan unit further includes scan side changer rollers feeding the sheet of the duplex document to pass the reader so that a second side of the sheet faces the reader, and
the reverse output unit includes stack side reverse rollers and final output rollers, the stack side reverse rollers rotate in a forward direction to temporarily discharge the sheet to a predetermined tray after both sides of the sheet have been scanned and rotate in a reverse direction to turn over the sheet, the final output rollers receiving the sheet from the stack side reverse rollers and outputting the sheet.

14. The method of claim 13, further comprising driving the scan side changer rollers, the stack side reverse rollers, and the final output rollers with a single motor.

15. The method of claim 14, further comprising selectively driving the scan side changer rollers and the final output rollers in one of a forward direction and a reverse direction, and driving the stack side reverse rollers in the other of the forward direction and reverse direction.

16. The method of claim 13, wherein the scan side changer rollers are driven by a first motor, the stack side reverse rollers and the final output rollers are driven by a second motor.

17. The method of claim 13, further comprising selecting a path for the sheet according to whether a second side of the sheet has been scanned.

18. The method of claim 13, wherein during the scanning of a second side of the sheet of duplex document, a next sheet of the duplex document is fed so that the two sheets pass the reader with a predetermined distance therebetween.

* * * * *